United States Patent
Kim et al.

(10) Patent No.: US 7,054,298 B1
(45) Date of Patent: May 30, 2006

(54) DEVICE AND METHOD FOR TRANSMITTING PREAMBLE OF ACCESS CHANNEL IN MOBILE COMMUNICATION SYSTEM

(75) Inventors: Young-Ky Kim, Seoul (KR); Hee-Won Kang, Seoul (KR); Jae-Min Ahn, Seoul (KR); Su-Won Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/376,743

(22) Filed: Aug. 17, 1999

(30) Foreign Application Priority Data

Aug. 17, 1998 (KR) ................................. 98-33862

(51) Int. Cl.
*H04B 7/216* (2006.01)
*H04J 3/06* (2006.01)

(52) U.S. Cl. .................. 370/342; 370/335; 370/350
(58) Field of Classification Search ............... 370/335, 370/342, 350, 503, 509
See application file for complete search history.

(56) References Cited

U.S. PATENT DOCUMENTS

| | | | | |
|---|---|---|---|---|
| 4,730,307 A | * | 3/1988 | Hughes et al. ............... | 370/445 |
| 4,817,146 A | * | 3/1989 | Szczutkowski et al. ..... | 380/261 |
| 5,375,252 A | * | 12/1994 | Hashimoto .................. | 455/51.2 |
| 5,568,509 A | | 10/1996 | Hershey et al. | |
| 6,154,486 A | * | 11/2000 | Scott et al. .................. | 375/142 |
| 6,208,696 B1 | * | 3/2001 | Giles ........................... | 375/272 |
| 6,314,090 B1 | * | 11/2001 | Nakamura et al. ........... | 370/335 |

FOREIGN PATENT DOCUMENTS

| | | |
|---|---|---|
| EP | 0 715 422 | 6/1996 |
| JP | 2001-503234 | 3/2001 |
| JP | 2002-521980 | 7/2002 |
| WO | WO 97/46041 | 12/1997 |
| WO | WO 98/18280 | 4/1998 |
| WO | WO 98/19405 | 5/1998 |
| WO | WO 99/59268 | 11/1999 |
| WO | WO 00/07377 | 2/2000 |

OTHER PUBLICATIONS

Canadian Office Action dated Dec. 3, 2002, issued in a counterpart application, namely, Appln. No. 2,305,889.
Japanese Office Action dated Jan. 14, 2003, issued in a counterpart application, namely Appln. No. 2000-564424.
Japanese Office Action dated Aug. 12, 2003, issued in a counterpart application, namely, Appln. No. 2000-564424.
"Mobile Station-Base Station Compatibility Standard for Dual-Mode Spread Spectrum Systems", Oct. 31, 1998.
Ovesjo Fredrik: UTRA Physical Layer Description, FDD parts, European Telecommunication Standard, Jun. 25, 1998.

* cited by examiner

*Primary Examiner*—Doris H. To
*Assistant Examiner*—Eugene Yun
(74) *Attorney, Agent, or Firm*—Dilworth & Barrese, LLP

(57) ABSTRACT

A mobile station device and method which includes a preamble generator for generating a preamble signal intermittently to be transmitted during a preamble interval prior to a transmission interval of a reverse access channel message; and a transmitter for spreading and modulating the preamble signal received from the preamble generator and transmitting it to a base station.

32 Claims, 11 Drawing Sheets

DEVICE AND METHOD FOR TRANSMITTING PREAMBLE OF ACCESS CHANNEL IN MOBILE COMMUNICATION SYSTEM

PRIORITY

This application claims priority to an application entitled "Device and Method for Transmitting Preamble of Access Channel in Mobile Communication System" filed in the Korean Industrial Property Office on Aug. 17, 1998 and assigned Serial No. 98-33862, the contents of which are hereby incorporated by reference.

BACKGROUND OF THE INVENTION

1. Field of the Invention

The present invention relates generally to a mobile communication system and, more particularly, to a device and method for transmitting a preamble of an access channel in a CDMA (Code Division Multiple Access) mobile communication system.

2. Description of the Related Art

The term "access channel" as used herein refers to all channels transmitted by a transmission party requesting a reception party to establish a link for the channels. That is, the access channel refers to all channels on which a known signal such as a preamble is transmitted prior to transmission of a message. The access channel used herein is not specifically limited to an access channel as conventionally defined in related art mobile communication systems. For instance, the access channels include reverse access channel (R-ACH), reverse common control channel (R-CCCH), and reverse dedicated access channel (R-DACH).

In order to accurately receive a signal from the transmission party, the reception party has to be in synchronization with the signal transferred from the transmission party. This sync acquisition is a very important factor which determines capability of the CDMA communication system.

In a mobile communication system, a mobile station acquires synchronization with a signal received from a base station according to a specified sync acquisition procedure beginning at the moment the mobile station turns power on. The mobile station maintains the synchronization through a sync tracing procedure that lasts until the mobile station turns the power off, so that it can resume communications with the base station at any time. In the sync acquisition procedure, the mobile station uses a reference signal such as a pilot channel. The reference signal is transmitted to an unspecified mobile station within a cell area that is controlled by the base station. The base station can transmit the reference signal continuously while the system operates, since the reference signal is transmitted to an unspecified mobile station. Because the reference signal is previously scheduled between the base station and the mobile station according to a certain engagement, the mobile station can receive signals from the base station whenever the power is switched on, by tracing the reference signal and acquiring synchronization with it.

In contrast, the sync acquisition procedure at the base station does not begin at the moment the mobile station switches the power on. The reason for this is that the mobile station inhibits unnecessary signal transmission and establishes a transmit link only at the moment a message or data to transmit exists, thereby minimizing power consumption at the mobile station and reducing interference on the base station. This link establishing procedure includes the sync acquisition procedure in which the base station acquires synchronization with a signal received from the mobile station.

For efficient sync acquisition, the mobile station transmits a preamble PA shown in FIG. 2 to the base station for a defined time interval prior to sending a message or data. The term "preamble" as used herein refers to a signal previously scheduled between the base station and the mobile station. In most mobile communication systems, the beginning of the preamble transmission interval is determined by a fixed system parameter, or can be selected at the mobile station based on the transmission time available as determined by visual information in the system. Here, the visual information is obtained from a base station signal acquired after the mobile station switches the power on. A receiver at the mobile station detects the preamble at the beginnings of all preamble transmission intervals estimated from the visual information of the system and acquires synchronization. Upon detection of the preamble, the base station performs sync acquisition and sync tracing procedures to receive a message following the preamble.

FIG. 1 is an illustrative diagram of an access channel transmitter at the mobile station in accordance with prior art.

Referring to FIG. 1, a preamble generator 120 generates a preamble as indicated by the reference numeral 210 of FIG. 2. An amplifier 122 raises transmission power for a reverse pilot channel (R-PICH) in the preamble interval to be higher than transmission power for the reverse pilot channel in an access channel message (message capsule) interval. A selector 124 is used to select the preamble interval and the message transmission interval. The selector 124 selects the output of the amplifier 122 at the beginning of the preamble interval and selects a non-amplified signal at the ending of the preamble interval. This operation of the selector 124 is performed once per one access channel. But, there is no need to separately use the selector 124 in a case where the amplifier 122 converts amplification gain from pilot gain ("Gp") to "1" in the preamble interval and the message transmission interval. That is, the amplifier 122 sets the gain to "Gp" at the beginning of the preamble interval and sets the gain to "1" at the ending of the preamble interval. The gain of the amplifier 122 is set only once during one access channel interval. A mixer 110 multiplies orthogonal codes (+1, −1, +1, −1) by a transmission symbol for the access channel so as to distinguish the access channel from the reverse channel. The access channel is not transmitted in the preamble interval but transmitted to the base station at the beginning of the message capsule interval, i.e., after the ending of the preamble interval. An amplifier 130 determines a transmission power ratio of the reverse pilot channel to the access channel in the message capsule interval. A complex spreader 140 spreads a signal for the reverse pilot channel, a signal for the access channel and PNi (Pseudo-random Noise in-phase) and PNq (Pseudo-random Noise quadrature phase) sequences. Among the signals spread at the complex spreader 140, a real signal is applied to a filter 150 and an imaginary signal is applied to a filter 152. The filters 150 and 152 are pulse forming filters for the transmit signal. Amplifiers 160 and 162 amplify the outputs of the filters 150 and 152 to a strength which is transmittable through an antenna. Mixers 170 and 172 multiply the output signals of the amplifiers 160 and 162 by a carrier and convert them to radio frequency (RF) band signals. A π/2 phase converter 180 maintains a phase difference between a carrier multiplied by the I (In-phase) channel and a carrier multiplied by the Q (Quadrature phase) channel at 90 degrees. A combiner 190 combines the outputs of the mixers 170 and 172 and outputs the combined signals to the antenna.

Now, reference will be made in connection with FIG. 2 as to an example of a signal structure transmitted on an access channel at the mobile station in accordance with the prior art.

Referring to FIG. 2, the mobile station transmits a preamble 210 to the base station for a defined period of time (e.g., N*1.25 ms) prior to the message capsule interval. The mobile station then sends a reverse pilot channel with transmission power lowered to the strength as indicated by the reference numeral 280. The preamble and the reverse pilot channel may be generated from an identical sequence generator or different sequence generators. The reverse pilot channel is used for reverse link channel estimation or sync tracing procedure and may include forward pilot information. The reason that the preamble 210 is transmitted with higher transmission power than is used for the reverse pilot channel is to facilitate preamble detection and sync acquisition at the base station. That is, the higher transmission power for the preamble 210 is used to increase detection probability and reduce miss probability and false alarm probability. A message capsule 280 contains a reverse channel message and data to be transmitted to the base station.

A problem with the related art access channel transmitting method is that the preamble transmission interval is relatively long and the preamble is transmitted with relatively high transmission power though there is no message to transmit, thereby increasing interference on the reverse link channel. Therefore, there is a need for a method for minimizing interference on the reverse link channels as well as increasing detection probability for the preamble.

SUMMARY OF THE INVENTION

It is, therefore, an object of the present invention to provide a device and method for transmitting a preamble of an access channel in a CDMA communication system, in which a mobile station transmits the preamble to a base station intermittently, thereby reducing interference on reverse link channels and power consumption.

It is another object of the present invention to provide a device and method for communicating a preamble of an access channel in a CDMA communication system, in which transmission of the preamble and an access channel message is determined according to whether the mobile station receives preamble detection information from the base station in transmitting the preamble on the access channel intermittently.

To achieve the above objects of the present invention, a mobile station device includes a preamble generator for generating a preamble signal intermittently to be transmitted during a preamble interval previous to a transmission interval of a reverse access channel message; and a transmitter for spreading and moduating the preamble signal received from the preamble generator and transmitting it.

BRIEF DESCRIPTION OF THE DRAWINGS

The above and other objects, features and advantages of the present invention will become more apparent from the following detailed description when taken in conjunction with the accompanying drawings in which like reference numerals indicate like parts. In the drawings.

DETAILED DESCRIPTION OF THE PREFERRED EMBODIMENT

Figure 1:
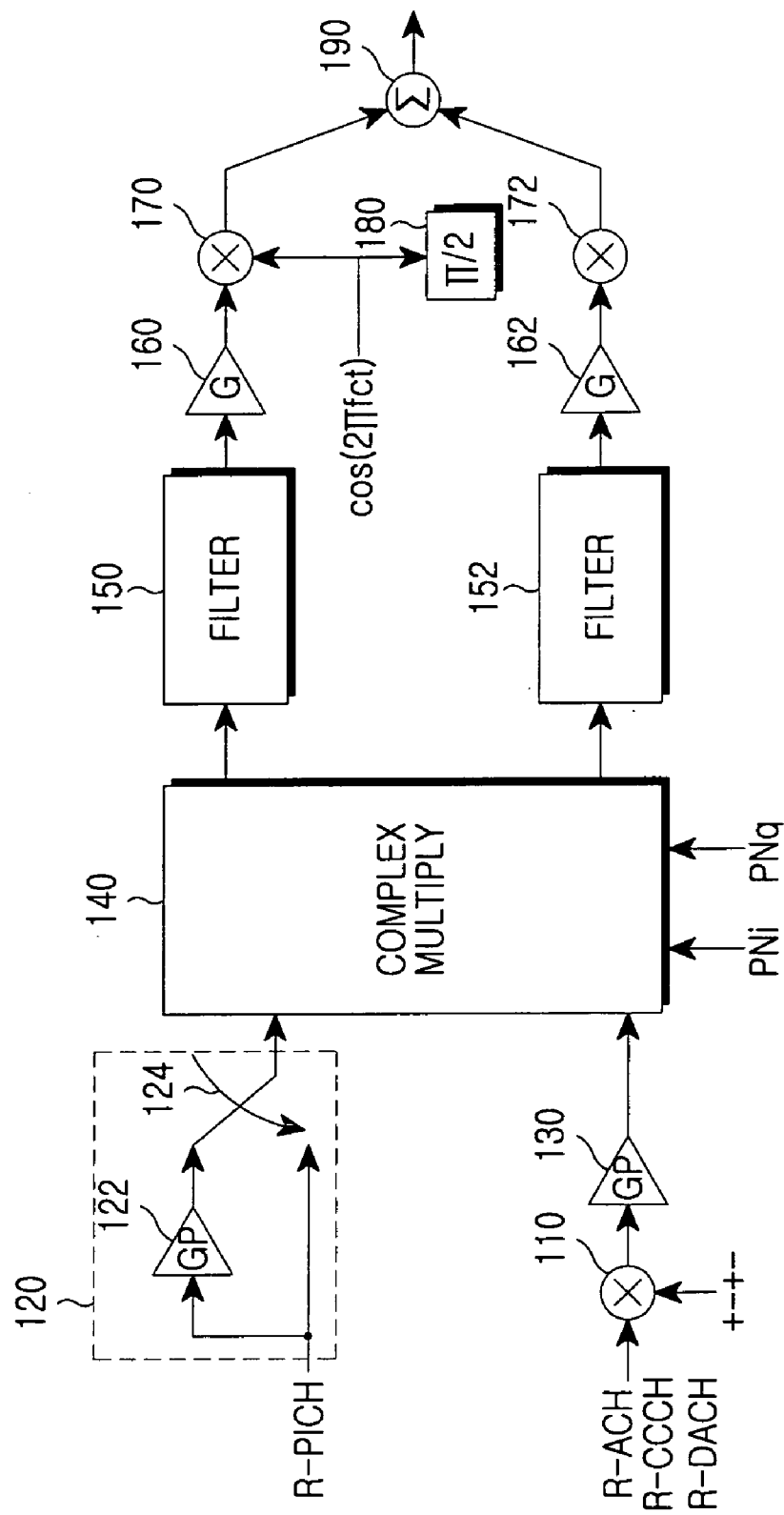
FIG. 1 is a block diagram illustrating an access channel transmitter at a mobile station in accordance with prior art.
Figure 2:
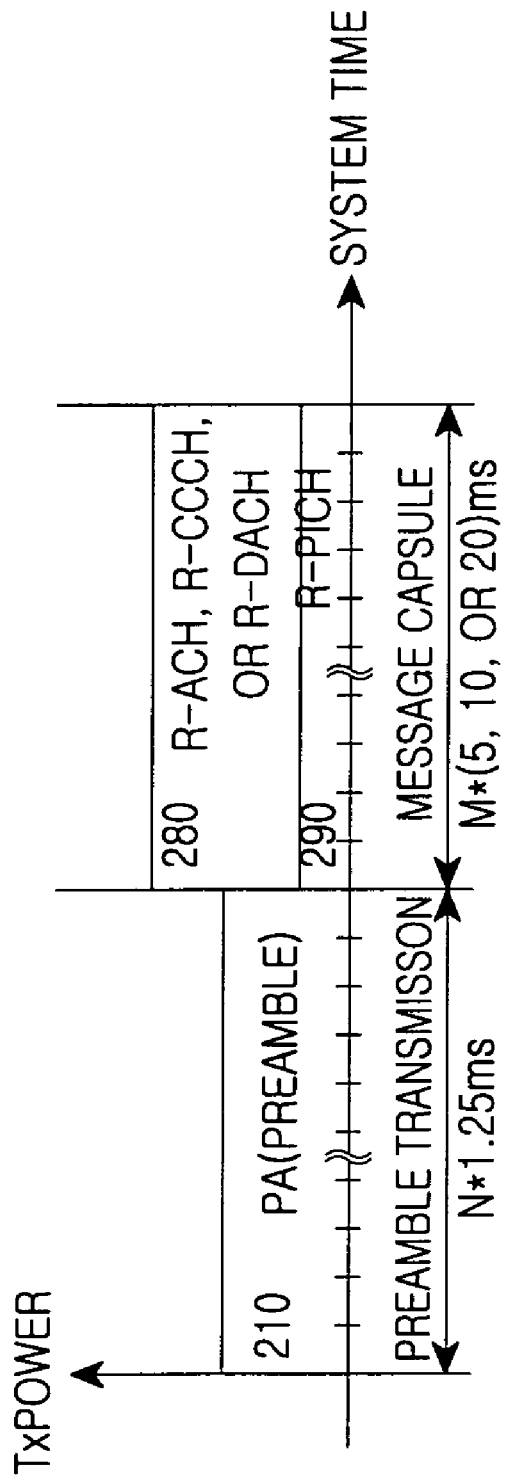
FIG. 2 is a diagram illustrating signal transmission on an access channel in accordance with the prior art.

The present invention is directed to a CDMA mobile communication system. Preferred embodiments of the present invention are exemplary only and are not to be considered as limiting the scope of the invention.

In the following description, the same reference numeral denotes the same component and well-known functions or constructions are not described in detail since they would obscure the invention in unnecessary detail.

Now, reference will be made in connection with FIG. 3 as to an access channel transmitter at a mobile station in accordance with an embodiment of the present invention.

Figure 3:
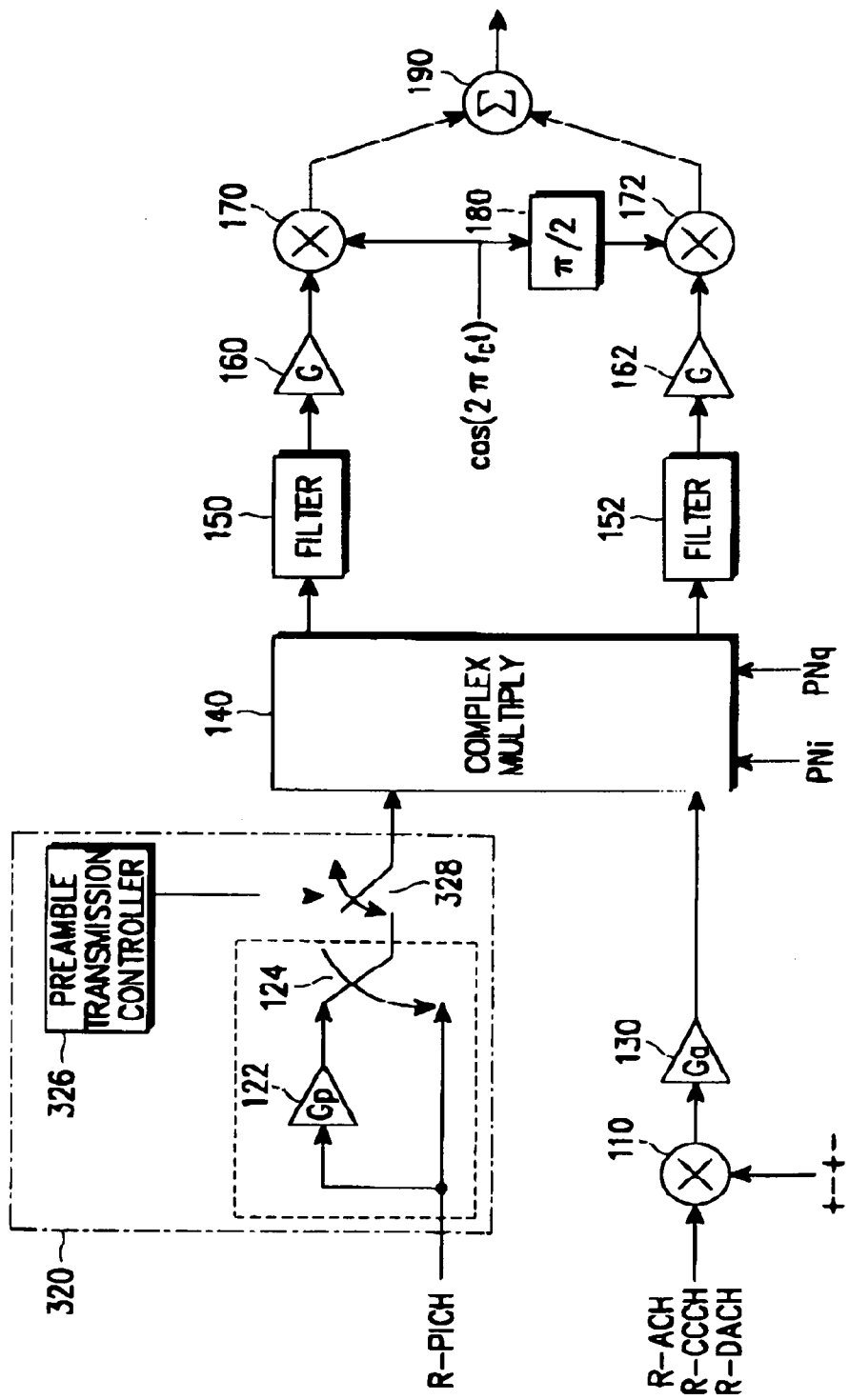
FIG. 3 is a block diagram illustrating an access channel transmitter at a mobile station in accordance with an embodiment of the present invention.

Referring to FIG. 3, a preamble transmission controller 326 and a gating element 328 in a preamble generator 320 are used to transmit a preamble intermittently. Parameters for this gating procedure are given as system parameters according to which the mobile station transmits the preamble intermittently. The system parameters may include gating location, gating duration and gating period, etc. In a preamble interval, a selector 124 selects the output of an amplifier 122 and the preamble transmission controller 326 turns the gating element 328 on/off according to the gating parameters. The preamble is transmitted when the gating element 328 is on; otherwise, it is not transmitted when the gating element 328 is off. The preamble can be transmitted with higher transmission power than is used in the related art method in which the preamble is not gated. A transmission power increment may be a system parameter added to the initial transmission power, calculated by open loop power control. At the ending of the preamble interval and concurrently the beginning of a message capsule interval, the selector 124 selects the lower output of the amplifier 122 in order to select a reverse pilot channel. In the meanwhile, the preamble transmission controller 326 maintains the gating element 328 to be "on" until the end of the access channel, thereby enabling continuous transmission of the reverse pilot channel.

Following transmission of the preamble in the preamble interval, the preamble transmission controller 326 controls the gating element 328 according to preamble detection information received from a base station and interrupts unnecessary preamble transmission. To minimize delay of the preamble detection information, the base station transmits the preamble detection information to the mobile station without using channel coding or using channel coding with minimal delays, such as block coding. Upon receiving the preamble detection information from the base station, the preamble transmission controller 326 at the mobile station controls the gating element 328 to interrupt transmission of the preamble that is scheduled in the rest of the interval. Upon failure to receive the preamble detection information, the preamble transmission controller 326 continues to transmit the preamble as scheduled in the rest of the interval and checks on whether the preamble detection information is received. The above procedure is repeated until the end of the preamble interval.

A mixer 110 multiplies orthogonal codes (+1, −1, +1, −1) by transmission symbols for the access channel in order to distinguish the access channel from the reverse link channel. The access channel is transmitted at the beginning of the message capsule interval, i.e., at the ending of the preamble interval and interrupted in the preamble interval. An amplifier 130 determines a transmission power ratio of the reverse pilot channel to the access channel in the message capsule interval. A complex spreader 140 receives a signal of the reverse pilot channel, a signal of the access channel and PNi and PNq sequences to produce a complex-spread signal. Among the signals spread at the complex spreader 140, a real signal is applied to a filter 150 and an imaginary signal is applied to a filter 152. The filters 150 and 152 are pulse forming filters for the transmit signal. Amplifiers 160 and 162 amplify the outputs of the filters 150 and 152 to the strength transmittable via an antenna. Mixers 170 and 172 multiply the output signals of the amplifiers 160 and 162 by a carrier and convert them to RF band signals. A π/2 phase converter 180 maintains a phase difference between a carrier multiplied by the I (In-phase) channel and a carrier multiplied by the Q (Quadrature phase) channel at 90 degrees. A combiner 190 combines the outputs of the mixers 170 and 172 and outputs the combined signals to the antenna.

In FIGS. 4 to 12, illustrated examples of signal transmission on an access channel in accordance with the embodiments of the present invention are shown.

Figure 4:
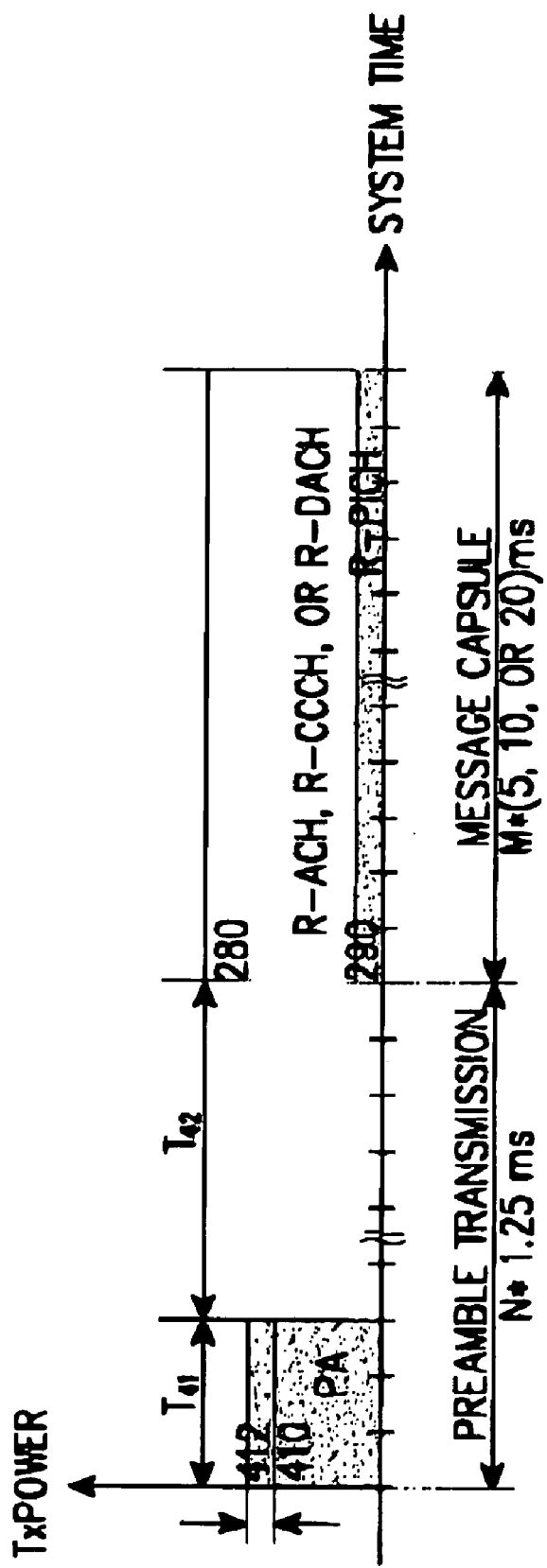
FIG. 4 is a diagram illustrating signal transmission on an access channel in accordance with the embodiment of the present invention.

FIG. 4 is an illustrative diagram of a method for transmitting a preamble signal during the former part of a preamble interval. Referring to FIG. 4, in the whole preamble interval (T41+T42), a preamble transmission interval is T41 and a preamble non-transmission interval is T42. The preamble is transmitted with transmission power 412, which is higher than the conventional preamble transmission power 410 by ΔP. It is assumed that the preamble interval has the same structure as in the conventional preamble transmitting method. Although the transmission power increment ΔP is taken into consideration, it is nevertheless possible to assign a relative low energy to the preamble interval by controlling the ratio of T41 to T42, thereby reducing interference on the other reverse link channels. A base station detects the preamble during an interval inclusive of the preamble transmission interval T41 based on the time interval estimated as the mobile station transmits the preamble. The preamble detection is performed with a correlator and a matched filter as conventionally used in the related art. In a case where the correlator is used, the preamble can be detected in real time or after storing signals received around the estimated interval T41 in a memory.

Figure 5:
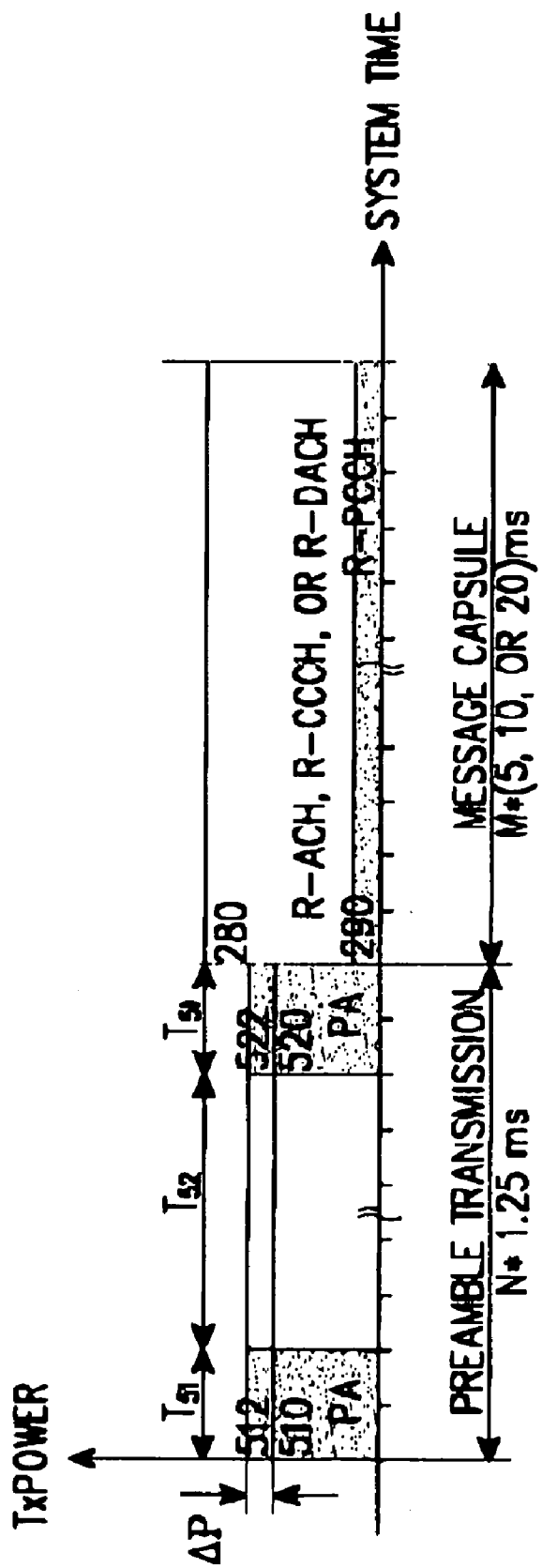
FIG. 5 is a diagram illustrating signal transmission on an access channel in accordance with another embodiment of the present invention.

FIG. 5 is an illustrative diagram of a method for transmitting a preamble signal during the former and latter parts of a preamble interval. Referring to FIG. 5, in the whole preamble interval (T51*2+T52), the preamble transmission interval is T51 and the preamble non-transmission interval is T52. After the preamble transmission interval T51 and the preamble non-transmission interval T52, the preamble is transmitted again for T51 just prior to the beginning of the message capsule interval. The preamble is transmitted with transmission power 512 (522), which is higher than the conventional preamble transmission power 510 (520) by ΔP. It is assumed that the preamble interval has the same structure as in the conventional preamble transmitting method. Although the transmission power increment ΔP is taken into consideration, it is nevertheless possible to assign a relatively low energy to the preamble interval by controlling the ratio of T51 to T52, thereby reducing interference on the other reverse link channels. The base station detects the preamble during an interval inclusive of the preamble transmission interval T51 based on the time interval estimated as the mobile station transmits the preamble. Preamble detection and sync acquisition may be achieved in the same manner as stated above with reference to FIG. 4.

The total preamble interval duration can be calculated using transmission intervals and non-transmission intervals of the preamble interval as shown in Equation (1), where T indicates the total preamble interval duration, N is an integer greater than or equal to zero, P indicates the duration of a transmission interval, B indicates a duration of a non-transmission interval, and A indicates a duration of a final transmission interval before the message capsule interval. As an example of the calculation of the total preamble interval duration, this relationship will be described below with reference to FIG. 6.

$$T=N(P+B)+A \qquad (1)$$

Figure 6:
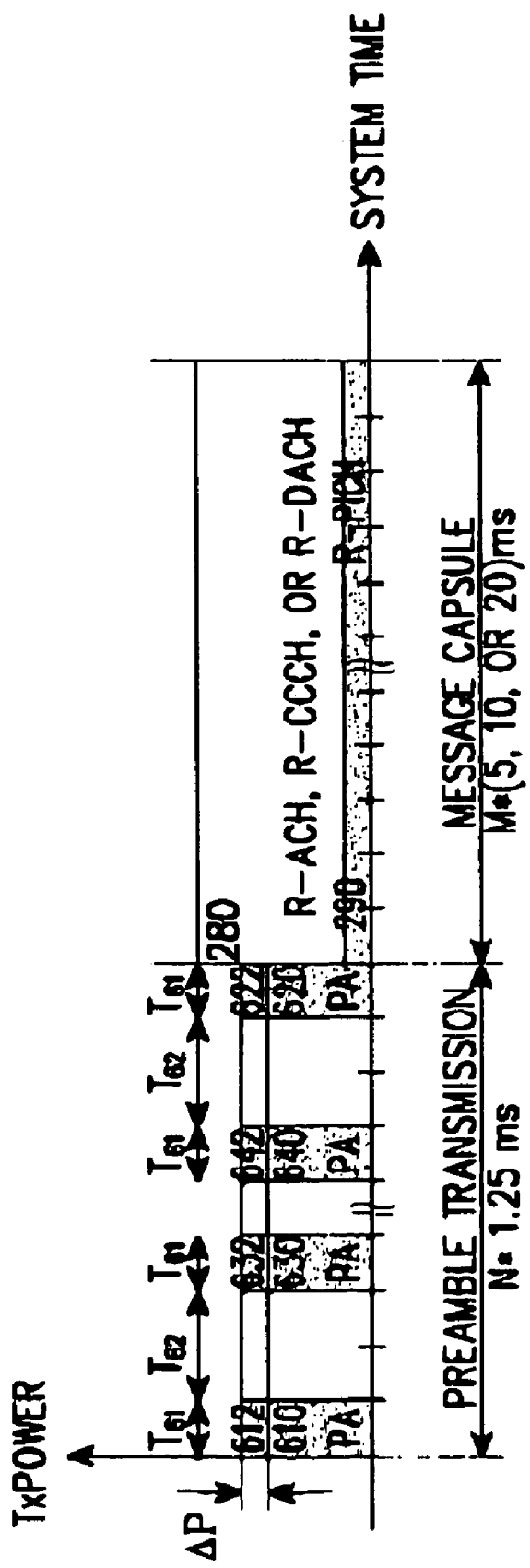
FIG. 6 is a diagram illustrating signal transmission on an access channel in accordance with a further embodiment of the present invention.

FIG. 6 is an illustrative diagram of a method for transmitting a preamble periodically in an intermittent manner. Referring to FIG. 6, in a preamble interval, the preamble transmission interval is T61 and the preamble non-transmission interval is T61. The preamble transmission interval T61 and the preamble non-transmission interval T62 are repeated periodically until the end of the preamble interval. The preamble can be transmitted again for T61 just prior to the beginning of the message capsule interval. The preamble interval is given by (T61+T62)*N+T61 or (T61+T62)*N, wherein N is an integer equal to or greater than zero. Here, transmission power 612 (622, 632, 642) for the preamble is higher than the conventional preamble transmission power 610 (620, 630, 640) by ΔP. It is assumed that the preamble interval has the same structure as in the conventional preamble transmitting method. Although the transmission power increment ΔP is taken into consideration, it is nevertheless possible to assign a relatively low energy to the preamble interval by controlling the ratio of T61 to T62, thereby reducing interference on the other reverse link channels. The base station detects the preamble during an interval inclusive of the preamble transmission interval T61 based on the time interval estimated as the mobile station transmits the preamble. Preamble detection and sync acquisition may be achieved in the same manner as stated above with reference to FIG. 4.

As an expanded conception of the preamble transmission for all access channels as stated above, a conception of feedback is introduced in the following two methods.

In a first method, the base station detects the preamble and acquires synchronization in a system where the preamble interval is fixed. The base station sends information about the preamble detection and sync acquisition to the mobile station to prevent the mobile station from transmitting the preamble unnecessarily in the rest of the preamble interval. Upon failure to receive the sync acquisition information from the base station, the mobile station transmits a preamble with transmission power increased by a given system parameter during the preamble transmission interval within the rest of the preamble interval. If there is no sync acquisition information received from the base station until the end of the preamble interval, the mobile station decides that the synchronization is not acquired at the base station, and does not transmit an access channel message to the base station.

In a second method, the base station detects the preamble and acquires synchronization in a system where the preamble interval is variable. Upon receiving sync acquisition information from the base station, the mobile station shortens the preamble interval and transmitting an access channel message to the base station. In the system where the preamble interval is variable, the maximum preamble interval is determined by a system parameter. Upon failure to receive the sync acquisition information in the preamble interval given by the system parameter, the mobile station transmits a preamble to the base station with transmission power increased by the system parameter during the preamble transmission interval within the rest of the preamble interval. If there is no sync acquisition information received from the base station until the end of the preamble interval, the mobile station decides that the synchronization is not acquired in the base station, and does not transmit an access channel message to the base station.

Now, a description will be made as to a case where a preamble is transmitted periodically in an intermittent manner and the feedback conception is introduced.

Figure 7:
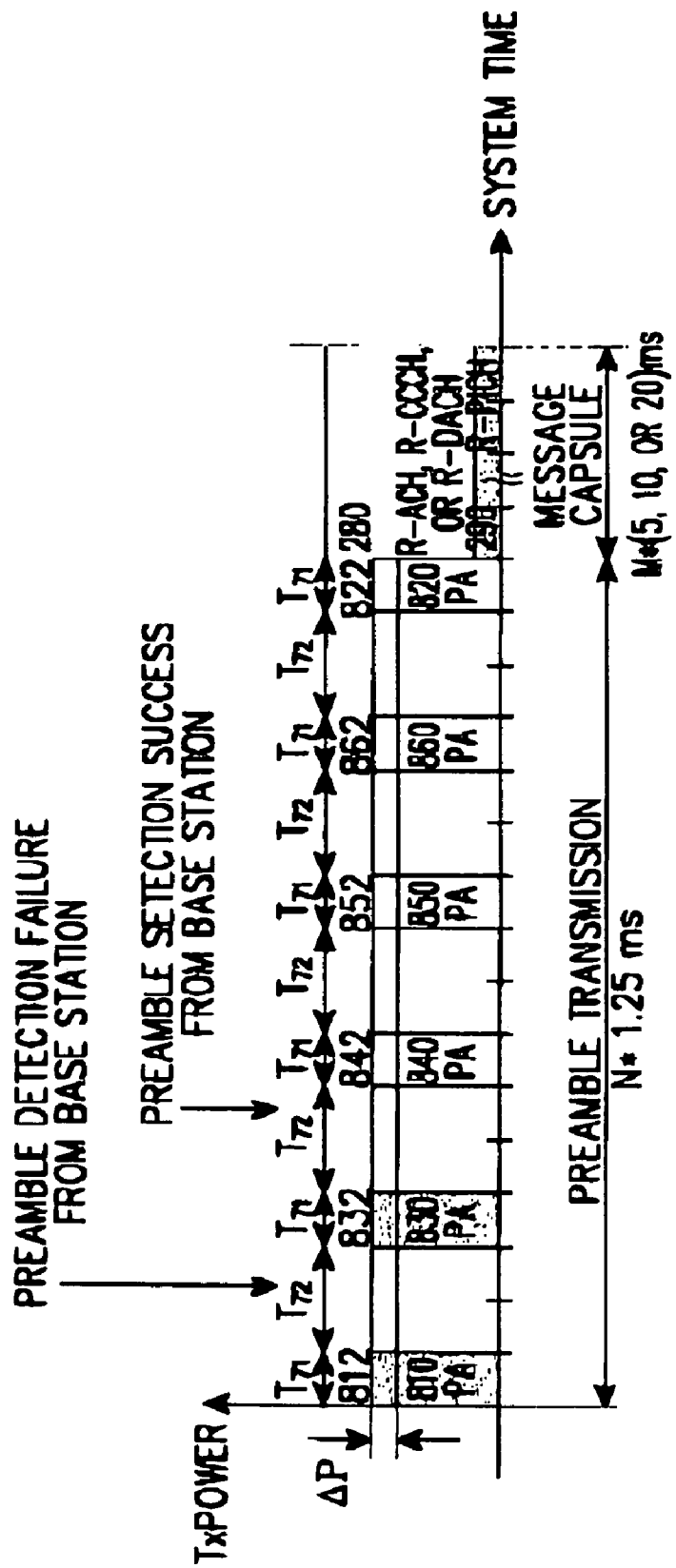
FIG. 7 is a diagram illustrating signal transmission on an access channel in accordance with still another embodiment of the present invention.
Figure 8:
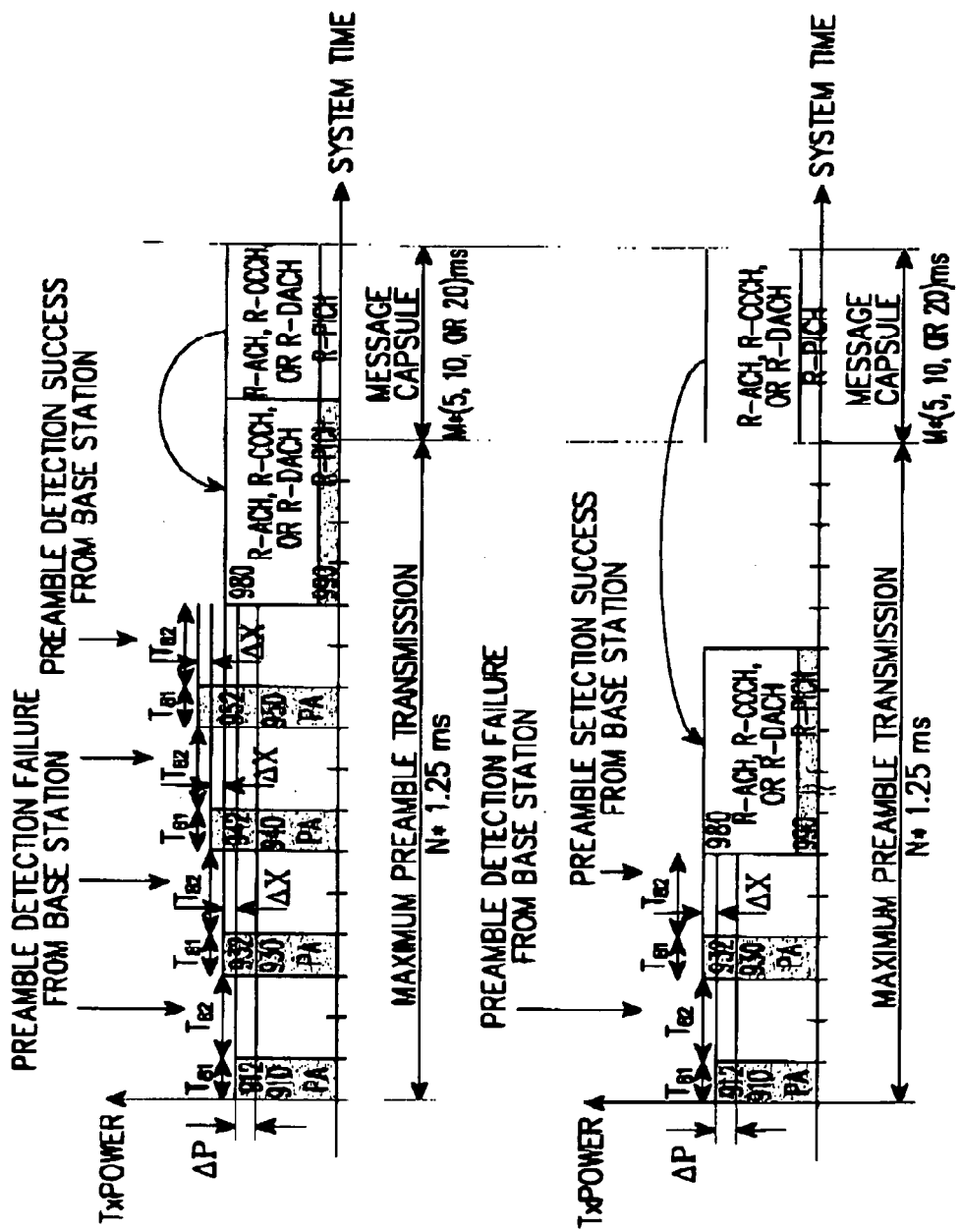
FIG. 8 is a diagram illustrating signal transmission on an access channel in accordance with still another embodiment of the present invention.

FIGS. 6 to 8 are illustrative diagrams of methods for transmitting a preamble intermittently. FIG. 6 illustrates a case where the feedback concept is not introduced in the preamble transmission. FIGS. 7 and 8 illustrate cases where the feedback concept is introduced in the preamble transmission in a fixed preamble interval and in a variable preamble interval, respectively. In FIGS. 6 to 8, a preamble transmission interval and a preamble non-transmission interval within the preamble interval are common to all mobile stations and determined by a system parameter.

Referring to FIG. 7, in the preamble interval, the preamble transmission interval is T71 and the preamble non-transmission interval is T72. The preamble transmission interval T71 and the preamble non-transmission interval T72 are repeated. During transmission of the preamble, the mobile station checks periodically on whether sync acquisition information is received from the base station. Then, the base station detects the preamble in an interval inclusive of the preamble transmission interval T71 and, upon detection of the preamble, sends the sync acquisition information to the mobile station. As illustrated, the mobile station sends the preamble for the transmission interval T71. Upon failure to receive the sync acquisition information from the base station within the preamble non-transmission interval T72, the mobile station sends a preamble to the base station for the next preamble transmission interval T71. However, upon receiving the sync acquisition information from the base station within the preamble non-transmission interval T72, the mobile station does not transmit the preamble any more in the rest of the preamble interval. Here, the mobile station transmits the preamble to the base station in the individual preamble transmission interval with transmission power higher than the conventional preamble transmission power 710 (720) by ΔP.

Referring to FIG. 8, in the preamble interval, the preamble transmission interval is T81 and the preamble non-transmission interval is T82. The preamble transmission interval T81 and the preamble non-transmission interval T82 are repeated. Here, preambles are transmitted to the base station in the individual preamble interval with transmission power higher than the previous preamble transmission power by ΔX. During the periodical preamble transmission, the mobile station checks whether the sync acquisition information is received from the base station. Then, the base station detects the preamble in an estimated interval inclusive of the preamble transmission interval T81 and, upon detection of the preamble, sends the sync acquisition information to the mobile station. As illustrated, the mobile station sends the preamble for the transmission interval T81. Upon failure to receive the sync acquisition information from the base station within the preamble non-transmission interval T82, the mobile station transmits a preamble to the base station in the next preamble transmission interval T81. Upon receiving the sync acquisition information from the base station within the preamble non-transmission interval T82, the mobile station does not transmit the preamble to the base station during the rest of the preamble interval and sends an access channel message in the next transmission interval. FIG. 8a shows that the mobile station transmits four preambles and, upon receiving the sync acquisition information, sends an access channel message A-ACH, R-CCCH or R-DACH in the next transmission interval. FIG. 8b shows that the mobile station transmits two preambles and, upon receiving the sync acquisition information, sends an access channel message A-ACH, R-CCCH or R-DACH in the next transmission interval.

Hereinafter, reference will be made to a case where preamble signals are transmitted in preamble transmission intervals dedicated to a specific mobile station during the preamble interval.

Figure 9:
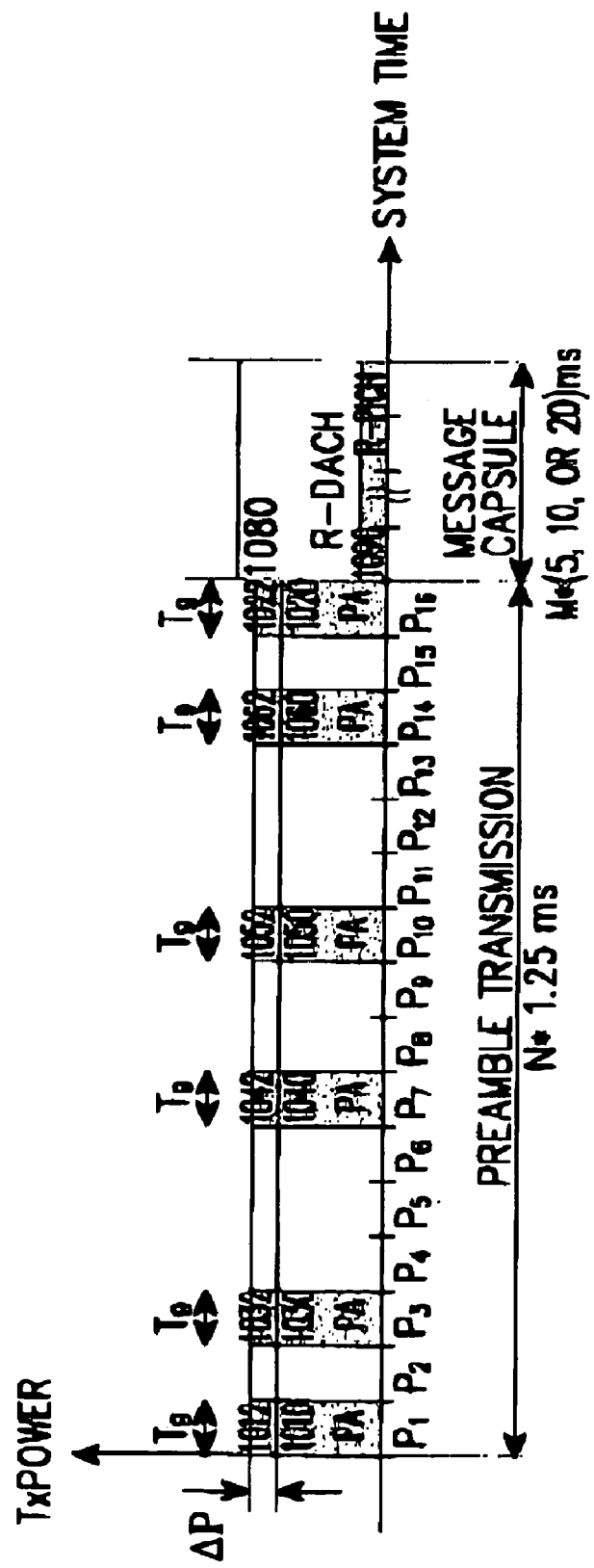
FIG. 9 is a diagram illustrating signal transmission on an access channel in accordance with still another embodiment of the present invention.
Figure 10:
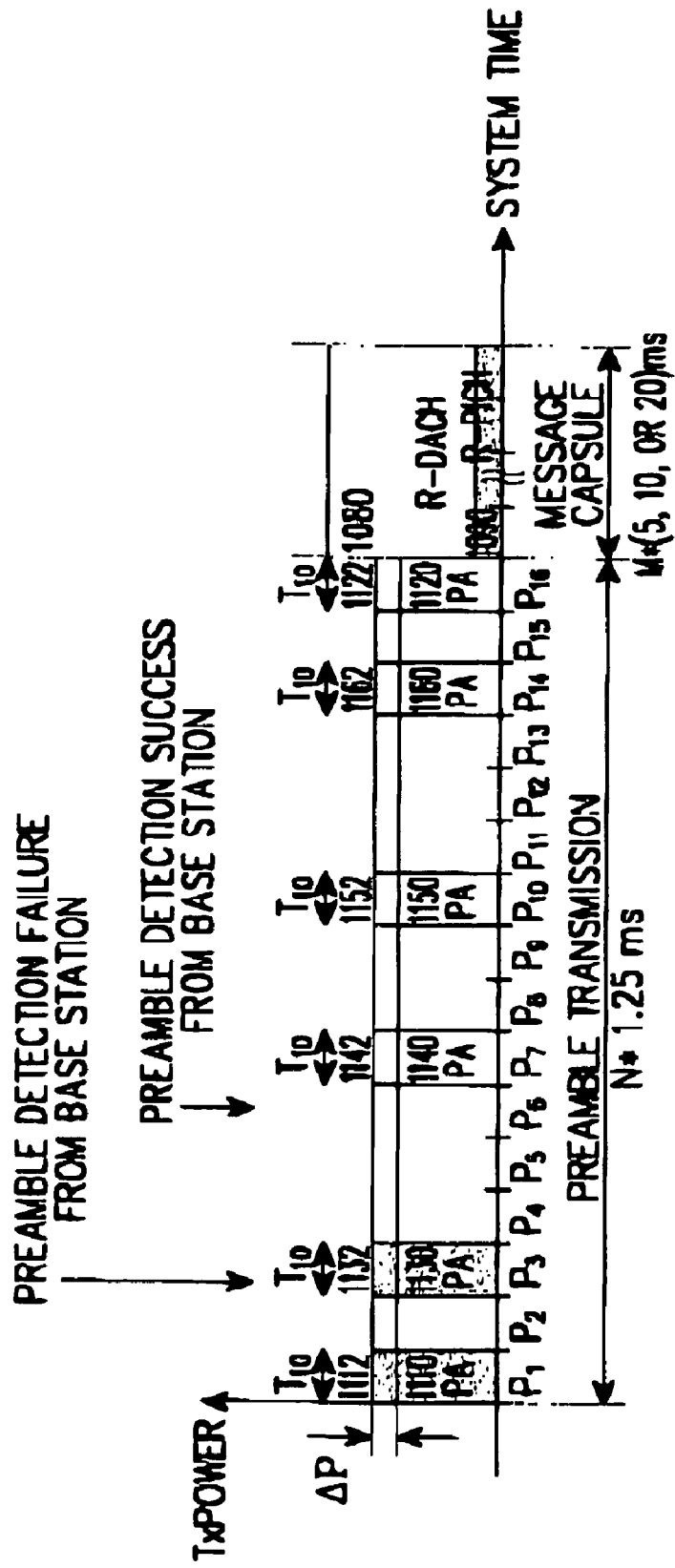
FIG. 10 is a diagram illustrating signal transmission on an access channel in accordance with still another embodiment of the present invention.
Figure 11:
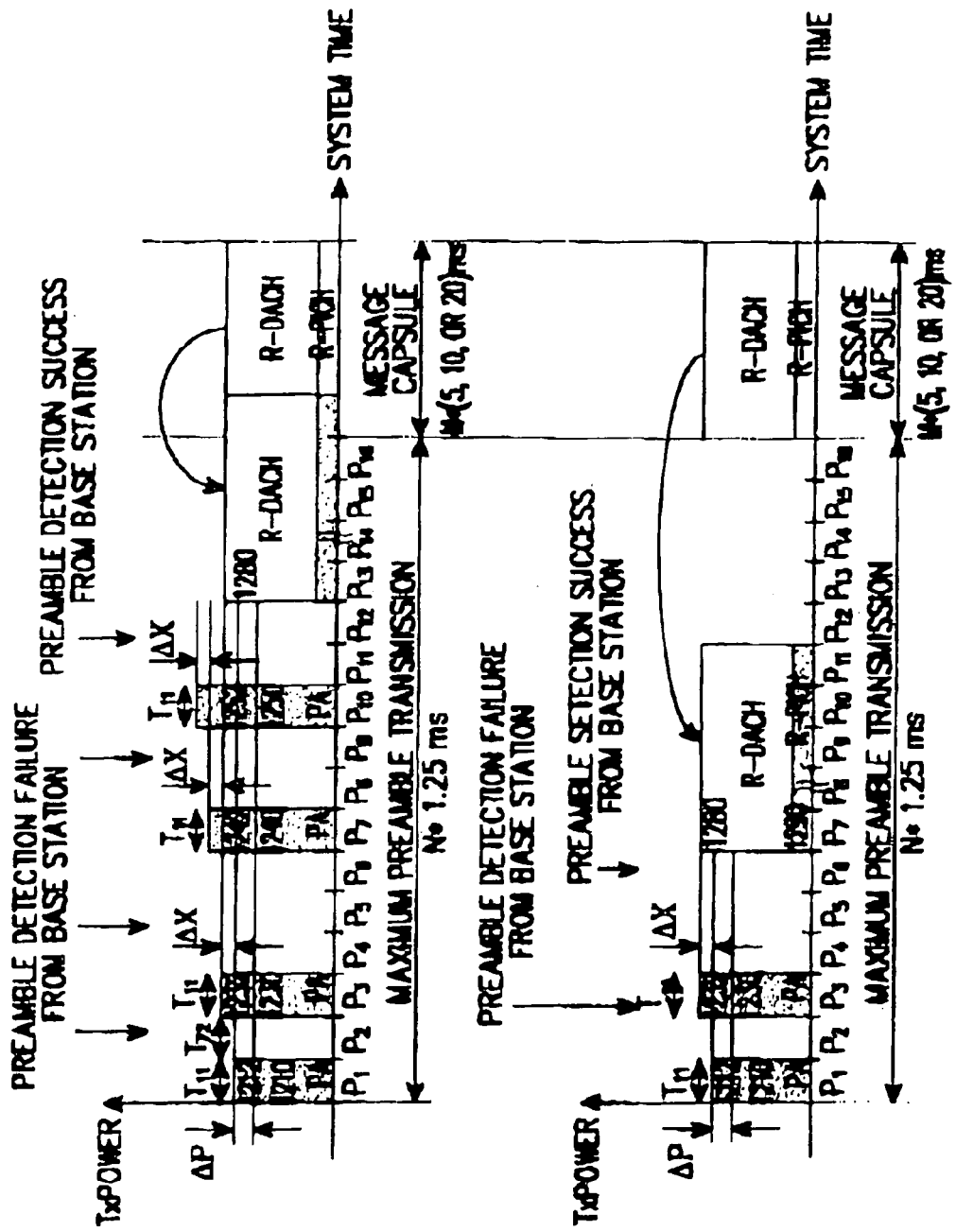
FIG. 11 is a diagram illustrating signal transmission on an access channel in accordance with still another embodiment of the present invention.

FIG. 9 illustrates a case where the feedback conception is not introduced in the preamble transmission. FIGS. 10 and 11 illustrate cases where the feedback conception is introduced in the preamble transmission in a fixed preamble interval and in a variable preamble interval, respectively. Here, the respective mobile stations transmit preambles to the base station in dedicated preamble transmission intervals of their own. This makes it possible to reduce interference of the reverse link channels that may be otherwise caused by different mobile stations while simultaneously requesting connection to the base station.

Referring to FIG. 9, in the preamble interval, preamble transmission intervals P1, P3, P7, P10, P14 and P16 are assigned to a mobile station A. The mobile station A transmits preambles in the intervals P1, P3, P7, P10, P14 and P16. A mobile station B transmits preambles in intervals P2, P5, P7, P9, P12 and P15. Interference may be increased in the interval P7 due to preamble transmission by the two mobile stations but interference on the other channels is reduced in the other intervals. That is, a peak-to-average ratio of the preamble transmission power can be reduced.

Referring to FIG. 10, the mobile station A transmits a preamble signal in transmission intervals P1, P3, P7, P10, P14 and P16 dedicated to itself and checks whether sync acquisition information is received from the base station. As illustrated, the mobile station A transmits the preamble signal in the interval P1 and checks whether the sync acquisition information is received from the base station, in the interval P2. Upon failure to receive the sync acquisition information, the mobile station A transmits the preamble signal in the interval P3 and checks on whether the sync acquisition information is received from the base station, in the next preamble non-transmission intervals P4, P5 and P6. Upon receiving the sync acquisition information, the mobile station A does not transmit the preamble any more and sends an access channel message at the end of the preamble transmission interval.

On the other hand, referring to FIG. 11, the mobile station transmits preamble signals in dedicated preamble transmission intervals in the same manner as described in connection with FIG. 10. However, upon receiving the sync acquisition information, the mobile station interrupts preamble transmission and concurrently sends the access channel message to the base station in the next preamble transmission interval. Here, preamble transmission power is increased by $\Delta X$ every time the mobile station transmits the preamble signal. This is intended to facilitate sync acquisition at the base station. The transmission power increment $\Delta X$ is given as a system parameter. Alternatively, to make the same effect as illustrated in FIG. 11, the preambles are transmitted in the individual preamble transmission interval fixed within the preamble interval, with the beginnings of the preamble intervals varied.

As described above, the present invention has the following advantages over the related art preamble transmitting method. First, during transmission of an access channel to the base station, the mobile station transmits a preamble intermittently to prevent the mobile station from using excessive transmission power for preamble detection and sync acquisition. This reduces unnecessary power consumption at the mobile station when a waiting time is increased and prevents deterioration of the quality of reverse link channels. Second, in a system where the preamble interval is fixed, the base station sends preamble detection and sync acquisition information to the mobile station so that the mobile station suspends preamble transmission to the base station. This reduces interference on the reverse link channels and the transmission power at the mobile station, thereby increasing a waiting time of the mobile station. Third, in a system where the preamble interval is variable, the base station sends preamble detection and sync acquisition information to the mobile station to shorten the preamble interval variably and makes the time for the message transmission earlier. This enables the mobile station to interrupt the preamble transmission and reduce interference on the reverse link channels and transmission power. As a result, a waiting time of the mobile station can be prolonged.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A mobile station device comprising:
   a preamble generator for generating a preamble signal to be transmitted in an intermittent pattern that reduces interference on other reverse link channels during a preamble interval prior to a transmission interval of a reverse access channel message; and
   a transmitter for spreading and modulating the preamble signal received from the preamble generator and transmitting it to a base station,
   wherein the preamble interval includes a non-transmission interval, and
   wherein the intermittent pattern is determined using $T=N(P+B)+A$,
   where T indicates a total duration of the preamble interval, N is an integer greater than or equal to zero, P indicates a duration of a transmission interval, B indicates a duration of the non-transmission interval, and A indicates a duration of a final transmission interval before the transmission interval of the reverse access channel message.

2. The mobile station device as claimed in claim 1, wherein the preamble generator comprises:
   a generator for generating a reverse pilot signal;
   an amplifier for amplifying the reverse pilot signal received from the generator to a predetermined strength; and
   a gating controller for intermittently transmitting the reverse pilot signal amplified at the amplifier.

3. The mobile station device as claimed in claim 1, wherein the preamble interval comprises a repeating cycle of a preamble transmission interval and a preamble non-transmission interval, and wherein the preamble generator generates the preamble signal during the preamble transmission interval.

4. The mobile station device as claimed in claim 3, wherein the preamble generator generates the preamble signal in the preamble transmission interval just prior to the transmission interval of the access channel message, the preamble transmission being provided during an ending part of the preamble interval.

5. The mobile station device as claimed in claim 3, wherein the preamble generator generates the preamble signal using transmission power increased by a predetermined level.

6. The mobile station device as claimed in claim 3, wherein the preamble generator interrupts generation of the preamble signal upon receiving sync acquisition information from the base station.

7. The mobile station device as claimed in claim 6, wherein the sync acquisition information is non-coded data.

8. The mobile station device as claimed in claim 3, wherein the mobile station shortens the preamble interval and immediately transmits the access channel message, upon receiving sync acquisition information from the base station.

9. The mobile station device as claimed in claim 3, wherein the preamble generator generates the preamble signal with transmission power increased by a predetermined level during a next preamble transmission interval, upon failure to receive sync acquisition information in the preamble non-transmission interval.

10. The mobile station device as claimed in claim 3, wherein the mobile station generates the preamble signal during the preamble transmission interval that is exclusively assigned to the mobile station.

11. The mobile station device as claimed in claim 1, wherein the preamble generator generates the preamble signal during a predefined part of the preamble interval.

12. The mobile station device as claimed in claim 1, wherein the preamble generator generates the preamble signal during predefined beginning and ending parts of the preamble interval.

13. The mobile station device as claimed in claim 1, wherein the power level of the preamble signal is higher than a reverse pilot channel.

14. The mobile station device as claimed in claim 1, wherein the preamble signal is a transmission of a reverse pilot channel at an increased power level.

15. The mobile station device as claimed in claim 1, wherein the preamble interval includes a plurality of transmission intervals and a plurality of non-transmission intervals.

16. A transmitting method at a mobile station comprising the steps of:
    generating a preamble signal to be transmitted intermittently by a transmitter in an intermittent pattern that reduces interference on other reverse link channels during a preamble interval prior to a transmission interval of a reverse access channel message; and
    spreading and modulating the preamble signal received from the preamble generator and transmitting it to a base station,
    wherein the preamble interval includes a non-transmission interval, and
    wherein the intermittent pattern is determined using $T=N(P+B)+A$,
    where T indicates a total duration of the preamble interval, N is an integer greater than or equal to zero, P indicates a duration of a transmission interval, B indicates a duration of the non-transmission interval, and A indicates a duration of a final transmission interval before the transmission interval of the reverse access channel message.

17. The method as claimed in claim 16, wherein the preamble signal generating step comprises the substeps of:
    generating a reverse pilot signal;
    amplifying the reverse pilot signal to a predetermined strength; and
    intermittently transmitting the amplified reverse pilot signal.

18. The method as claimed in claim 16, wherein the preamble interval comprises a repeating cycle of a preamble transmission interval and a preamble non-transmission interval, the preamble signal being generated during the preamble transmission interval.

19. The method as claimed in claim 18, wherein the preamble signal is generated in the preamble transmission interval just prior to the transmission interval of the access channel message, the preamble transmission being provided during an ending part of the preamble interval.

20. The method as claimed in claim 18, wherein the preamble signal is generated with transmission power increased by a predetermined level.

21. The method as claimed in claim 18, wherein the preamble signal generation stops upon receipt of sync acquisition information from the base station.

22. The method as claimed in claim 21, wherein the sync acquisition information is non-coded data.

23. The method as claimed in claim 18, wherein the mobile station shortens the preamble interval and immediately transmits the access channel message, upon receiving sync acquisition information from the base station.

24. The method as claimed in claim 18, wherein the preamble signal is generated with transmission power increased by a predetermined level during a next preamble transmission interval, upon failure to receive sync acquisition information in the preamble non-transmission interval.

25. The method as claimed in claim 18, wherein the preamble signal is generated during the preamble transmission interval exclusively assigned to a specified mobile station.

26. The method as claimed in claim 16, wherein the preamble signal is generated during a predefined part of the preamble interval.

27. The method as claimed in claim 16, wherein the preamble signal is generated during predefined beginning and ending parts of the preamble interval.

28. The method as claimed in claim 16, wherein the power level of the preamble signal is higher than a reverse pilot channel.

29. The method as claimed in claim 16, wherein the preamble signal is a transmission of a reverse pilot channel at an increased power level.

30. The method as claimed in claim 16, wherein the preamble interval includes a plurality of transmission intervals and a plurality of non-transmission intervals.

31. A mobile station device comprising:
    a preamble generator for generating a preamble signal to be transmitted intermittently during a preamble interval prior to a transmission interval of a reverse access channel message, using a plurality of transmission intervals and at least one non-transmission interval, said intervals being determined by a base station to reduce interference on other reverse link channels; and
    a transmitter for spreading and modulating the preamble signal received from the preamble generator and intermittently transmitting the spread and modulated preamble signal to the base station,
    wherein said intervals are determined using $T=N(P+B)+A$,
    where T indicates a total duration of the preamble interval, N is an integer greater than or equal to zero, P indicates a duration of a transmission interval, B indicates a duration of the non-transmission interval, and A indicates a duration of a final transmission interval before the transmission interval of the reverse access channel message.

32. A transmitting method at a mobile station comprising the steps of:
    generating a preamble signal to be transmitted intermittently by a transmitter during a preamble interval prior to a transmission interval of a reverse access channel message, using a plurality of transmission intervals and at least one non-transmission interval, said intervals being determined by a base station to reduce interference on other reverse link channels;
    spreading and modulating the preamble signal received from the preamble generator; and
    intermittently transmitting the spread and modulated preamble signal to the base station,
    wherein said intervals are determined using $T=N(P+B)+A$,
    where T indicates a total duration of the preamble interval, N is an integer greater than or equal to zero, P indicates a duration of a transmission interval, B indicates a duration of the non-transmission interval, and A indicates a duration of a final transmission interval before the transmission interval of the reverse access channel message.

* * * * *